(12) United States Patent
Nelson et al.

(10) Patent No.: US 10,630,079 B2
(45) Date of Patent: Apr. 21, 2020

(54) FAULT RIDE-THROUGH CAPABILITY FOR WIND TURBINE

(71) Applicant: SIEMENS AKTIENGESELLSCHAFT, München (DE)

(72) Inventors: Robert J. Nelson, Orlando, FL (US); John D. Amos, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/075,043

(22) PCT Filed: Feb. 3, 2016

(86) PCT No.: PCT/US2016/016263
§ 371 (c)(1),
(2) Date: Aug. 2, 2018

(87) PCT Pub. No.: WO2017/135937
PCT Pub. Date: Aug. 10, 2017

(65) Prior Publication Data
US 2019/0036343 A1    Jan. 31, 2019

(51) Int. Cl.
*H03J 3/00* (2006.01)
*H02J 3/38* (2006.01)
(Continued)

(52) U.S. Cl.
CPC ............ *H02J 3/386* (2013.01); *F03D 9/255* (2017.02); *H02J 3/12* (2013.01); *H02J 3/16* (2013.01);
(Continued)

(58) Field of Classification Search
CPC ...................................... H02J 3/386
(Continued)

(56) References Cited

U.S. PATENT DOCUMENTS

| 4,193,005 A | 3/1980 | Kos et al. |
| 6,128,204 A | 10/2000 | Munro et al. |

(Continued)

FOREIGN PATENT DOCUMENTS

| RU | 2013145508 A | 4/2015 |
| SU | 1098527 A3 | 6/1984 |

(Continued)

OTHER PUBLICATIONS

Banham-Hall D D et al: "Towards large-scale direct drive wind turbines with permanent magnet generators and full converters", 2010 IEEE Power and Energy Society General Meeting : [I EEE PES-GM 2010] ; Minneapolis, Minnesota, USA, Jul. 25-29, 2010, IEEE, Piscataway, NJ, USA, Jul. 25, 2010 (Jul. 25, 2010), pp. 1-8, XP031985661; 2010.

(Continued)

*Primary Examiner* — Adi Amrany
(74) *Attorney, Agent, or Firm* — Henry M. Feiereisen LLC

(57) ABSTRACT

A wind turbine system (20, 70) is connected to an electrical grid (42) by an inverter (38) that provides turbine terminal voltage (Vt) support to the grid during a grid low voltage fault that is concurrent with a lack of real power production from the generator (30) by providing reactive power to the grid. A processor (46) controls the inverter to preserve a minimum voltage on a local DC bus (34) by stopping the reactive power output when the DC bus voltage drops to a threshold value (59) that is above a low bus voltage trip setpoint (56). An energy storage device (48) such as a battery may be connected to the DC bus to provide power that supports a prolonged ride-through capability during the grid fault.

14 Claims, 4 Drawing Sheets

(51) Int. Cl.
　　　*H02J 3/12*　　　(2006.01)
　　　*H02J 3/18*　　　(2006.01)
　　　*F03D 9/25*　　　(2016.01)
　　　*H02J 3/16*　　　(2006.01)
(52) U.S. Cl.
　　　CPC .............. *H02J 3/18* (2013.01); *H02J 3/1892* (2013.01); *Y02E 10/763* (2013.01); *Y02E 40/30* (2013.01)
(58) Field of Classification Search
　　　USPC .......................................................... 307/52
　　　See application file for complete search history.

(56) References Cited

U.S. PATENT DOCUMENTS

| | | |
|---|---|---|
| 6,559,559 B2 | 5/2003 | Cratty |
| 7,701,087 B2 | 4/2010 | Eckroad et al. |
| 2002/0014802 A1 | 2/2002 | Cratty |
| 2008/0088183 A1 | 4/2008 | Eckroad et al. |
| 2009/0001725 A1* | 1/2009 | Llorente Gonzalez ..................... H02J 3/386 290/44 |
| 2013/0313826 A1* | 11/2013 | Gupta ................... H02H 7/065 290/44 |
| 2014/0049229 A1 | 2/2014 | Li |
| 2014/0059373 A1 | 2/2014 | Larsson et al. |
| 2014/0339830 A1* | 11/2014 | Gupta ....................... F03D 7/00 290/44 |
| 2015/0137520 A1* | 5/2015 | Garcia .................. H02J 3/1885 290/44 |
| 2016/0111883 A1 | 4/2016 | Beekmann et al. |
| 2017/0250534 A1* | 8/2017 | Yu ............................. H02J 3/18 |
| 2017/0314534 A1* | 11/2017 | Gupta ................... F03D 7/0284 |

FOREIGN PATENT DOCUMENTS

| | | |
|---|---|---|
| WO | WO 2012-152345 A1 | 11/2012 |
| WO | WO 2014180717 A1 | 11/2014 |

OTHER PUBLICATIONS

Yaramasu Venkata et al: "Predictive Control for Low-Voltage Ride-Through Enhancement of Three-Level-Boost and NPC-Converter-Based PMSG Wind Turbine", IEEE Transactions on Industrial Electron i cs, IEEE Service Center, Piscataway, NJ, USA, vol. 61, No. 12, Dec. 1, 2014 (Dec. 1, 2014), pp. 6832-6843, XP011558866.
International Search Report issued by the European Patent Office in International Application PCT/US2016/016263.

* cited by examiner

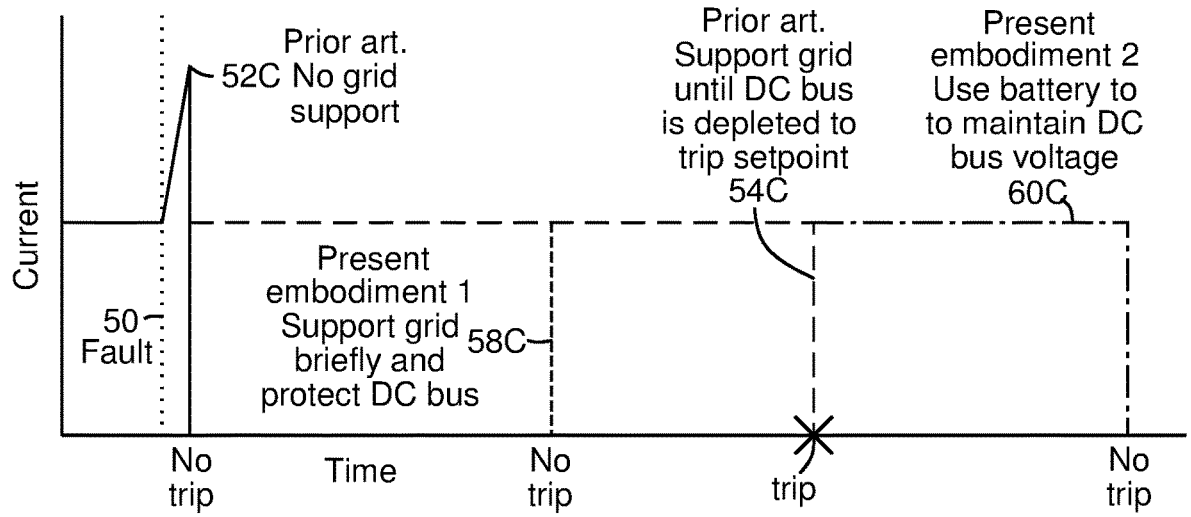
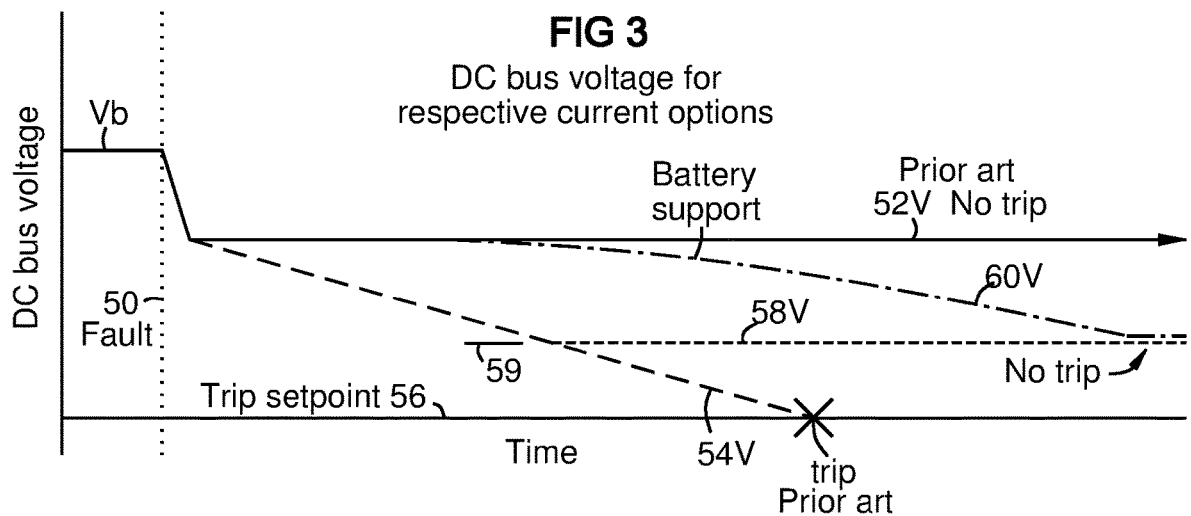

Options for providing reactive current to grid

DC bus voltage for respective current options

FAULT RIDE-THROUGH CAPABILITY FOR WIND TURBINE

CROSS-REFERENCES TO RELATED APPLICATIONS

This application is the U.S. National Stage of International Application No. PCT/US2016/016263, filed Feb. 3, 2016, which designated the United States and has been published as International Publication No. WO 20171135937.

FIELD OF THE INVENTION

The invention relates generally to the field of inverter based variable energy resources, and more specifically to a ride-through capability of a wind turbine generator system connected to an electrical grid by an AC-AC converter during a low voltage condition on the grid when no power is being generated by the wind turbine generator.

BACKGROUND OF THE INVENTION

During normal operation of a wind turbine, power is supplied to the rotor by the wind, which turns a generator, either via a gearbox in geared machines or directly in direct drive machines. Output from the generator is rectified to DC (direct current) by a generator-side converter and stored transiently in a DC bus in a capacitive electric field. The DC bus energy is supplied to a line-side converter, which inverts the DC energy to AC (alternating current) at electrical grid frequency. Herein "electrical grid" or "grid" means an electrical power distribution system connected to the output of the line-side converter. This includes, for example, a collection system in a wind turbine farm that collects power from multiple wind turbines, and may be considered a local grid. The line-side converter produces both active power measured in megawatts (MW) and reactive power measured in mega volt amps reactive (MVAR). Active power must be supplied from the generator, but reactive power may be produced by the line side converter without generator action. When the line side converter produces no active power, but provides reactive power to the grid, or absorbs reactive power from the grid, it is operating as a local voltage regulator. By providing reactive power to the grid, it boosts the local grid voltage, and by absorbing reactive power from the grid it decreases the grid voltage. When a turbine is operating in this mode, it is described as acting in "synchronous condenser mode" or "STATCOM mode". During this time, the generator and generator-side converter remain operative but are placed in a standby mode since they serve no function, and only the DC bus and the line-side converter are active.

During a low voltage condition on the grid, reactive current may be provided by the line-side inverter to support the grid voltage. Although purely reactive current does not transfer any net active or real power, it is not possible to provide reactive current without creating some active power losses, since all non-superconducting electrical components have series resistances. These deplete the voltage on the DC bus until a low DC bus voltage setpoint is met and the generator trips, which then may require several minutes to restart for diagnostics to be performed that no damage was done to the turbine associated with the trip. Real energy in the DC bus is described by $E=\frac{1}{2} C V^2$, where E is the energy, C is the DC bus capacitance, and V is the DC bus voltage. This energy is dissipated by losses in the system, so it must be replenished. When the wind turbine is producing power derived from the wind, this energy is obtained from wind power. However, during periods of low wind (below wind turbine cut-in speed) or high wind (above cut-out speed) or when needed by the system operator, it is sometimes desirable for wind turbines to operate as system voltage regulators without producing active power. When this occurs, DC bus energy must be supplied by the power system. If there is a 3-phase fault in the local power system, the system voltage drops to zero, so no power can be transferred. The DC bus energy is consumed in the process and the DC bus voltage drops. In this situation, the generator-side converter cannot replenish the DC bus to support real losses and there is a risk that the DC bus voltage will drop to unacceptably low levels or to zero, resulting in a turbine trip.

BRIEF DESCRIPTION OF THE DRAWINGS

The invention is explained in the following description in view of the drawings that show:

FIG. 2 shows aspects of two prior art options and two present embodiments for reactive current response to low grid voltage when generator power is unavailable.

FIG. 3 shows the DC bus voltage over time for respective options of FIG. 2.

DETAILED DESCRIPTION OF THE INVENTION

Figure 1:
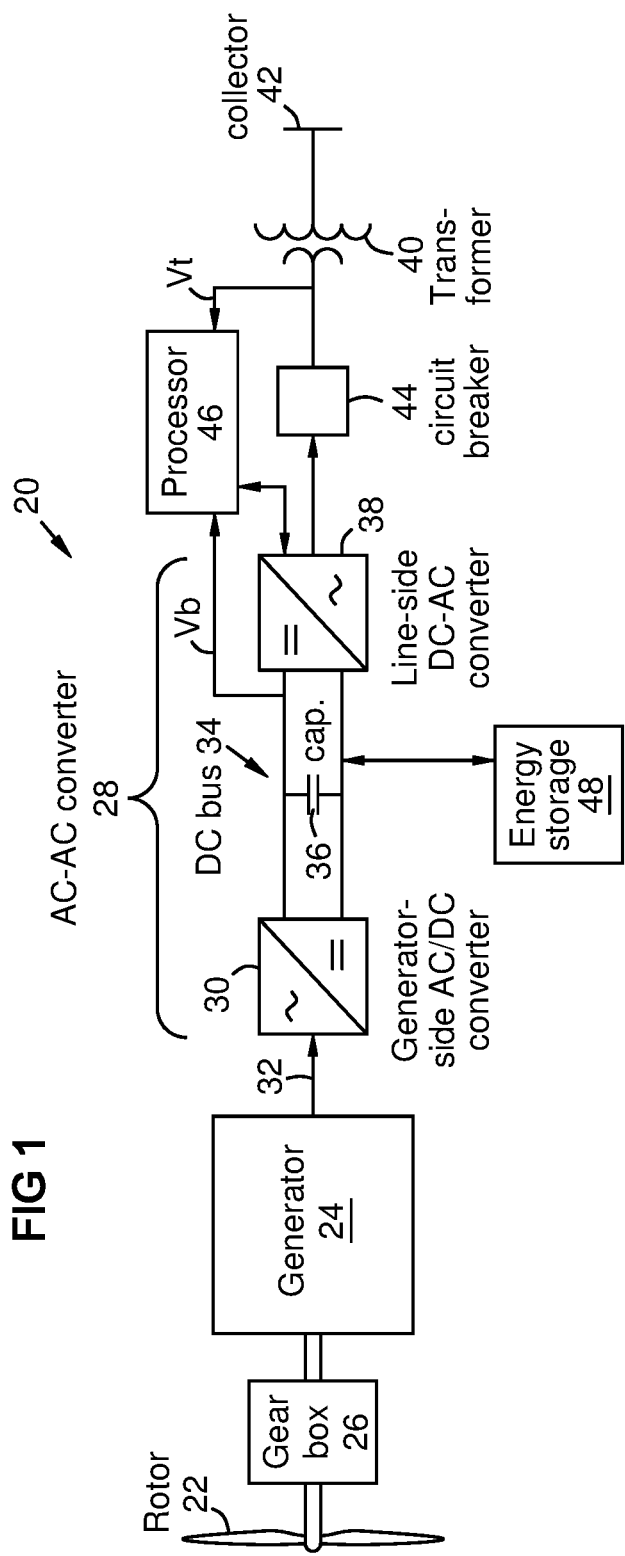
FIG. 1 is a schematic view of a wind turbine energy resource illustrating an aspect of an embodiment of the invention.

FIG. 1 shows a wind turbine energy resource 20 comprising an aerodynamic rotor 22 that drives a generator 24 by direct drive or via a gear box 26. An AC-AC converter 28 has a generator-side AC-DC converter 30 that receives power 32 from the generator and converts it to DC power on a DC bus 34, which may include a capacitor 36 for smoothing. A line-side DC-AC converter 38 (inverter) converts the DC voltage to AC at the grid frequency. This voltage is stepped-up by a transformer 40 for transmission to the grid. A collector 42 may collect power from one or more wind turbines and may be considered part of the grid for discussion herein. The line-side DC-AC converter is connected to the grid via a circuit breaker 44 that disconnects the output from the grid in certain fault conditions. A processor 46 controls the AC-AC converter and monitors a DC bus voltage level Vb and turbine terminal voltage level Vt. Herein "processor" means one or more digital and/or analog components that enable and execute control logic that controls the operation of other components. As used herein, the turbine terminal voltage (or terminal voltage) is the voltage on the low voltage side of transformer 40 and is directly related to the collector system voltage or grid voltage on the high voltage side of the transformer 40, so those terms may sometimes be used interchangeably herein as understood by one skilled in the art. As discussed more fully below, an energy storage device 48 such as a battery or other device may be connected to the DC bus to support voltage on the DC bus for a predetermined duration or ride-through during a low voltage condition on the grid when generator 24 power is unavailable and the unit is operating in STATCOM mode. This can occur when a fault on the grid such as an electrical short occurs while the generator 24 is not operating due to the wind being below a cut-in speed or above a cut-out speed, when an upstream component, such as the generator or generator-side converter, is removed from service for maintenance or when otherwise directed by the system operator.

FIGS. 2 and 3 show aspects of two prior art fault response options compared to first and second exemplary embodiments of the invention for controlling the reactive current output of the line-side converter 38 during a fault on the grid in STATCOM mode. In these figures, reference numerals beginning with 52 and 54 are prior art examples, and reference numerals beginning with 58 and 60 are embodiments of the invention. FIG. 3 shows the DC bus voltage Vb over time for respective current options of FIG. 2. A first prior art option reduces reactive current 52C to zero as soon as possible (subject to control system limitations) following the occurrence of a fault 50. This preserves voltage 52V on the DC bus 34. A second prior art option provides reactive current 54C to the grid until the voltage 54V on the DC bus is depleted to a low voltage trip setpoint 56. This results in the wind turbine energy resource 20 being tripped and taken off-line. The present inventors have recognized that neither of these options are desirable, because either no support is provided for the grid voltage, or a resynchronization of the wind turbine energy resource 20 to the grid is required.

A first embodiment of the invention provides reactive current 58C to the grid, but only for a limited time during which the DC bus voltage 58V remains above the trip setpoint 56. The line side converter 38 is controlled by the processor 46 to stop providing reactive power to the grid when the DC bus voltage reaches a predetermined threshold 59 above the DC bus low voltage trip setpoint 56.

A second embodiment of the invention provides reactive current 60C to the grid, and may use an energy storage device 48 (FIG. 1) that supports the voltage 60V on the DC bus above the trip setpoint 56 for a specified fault ride-through duration, such as at least 150 ms, for example. The energy storage device may be a battery or some other device. A relatively small capacitor 36 on the DC bus provides instantaneous voltage support, and the battery provides longer duration support. Power may further be provided to the bus by an auxiliary power generator of any appropriate type for longer grid support. Capacitors are more expensive but faster than batteries, so this staged energy support has synergy. This embodiment is especially useful for weak grids and in power systems with ride-through concerns or requirements.

Figure 4:
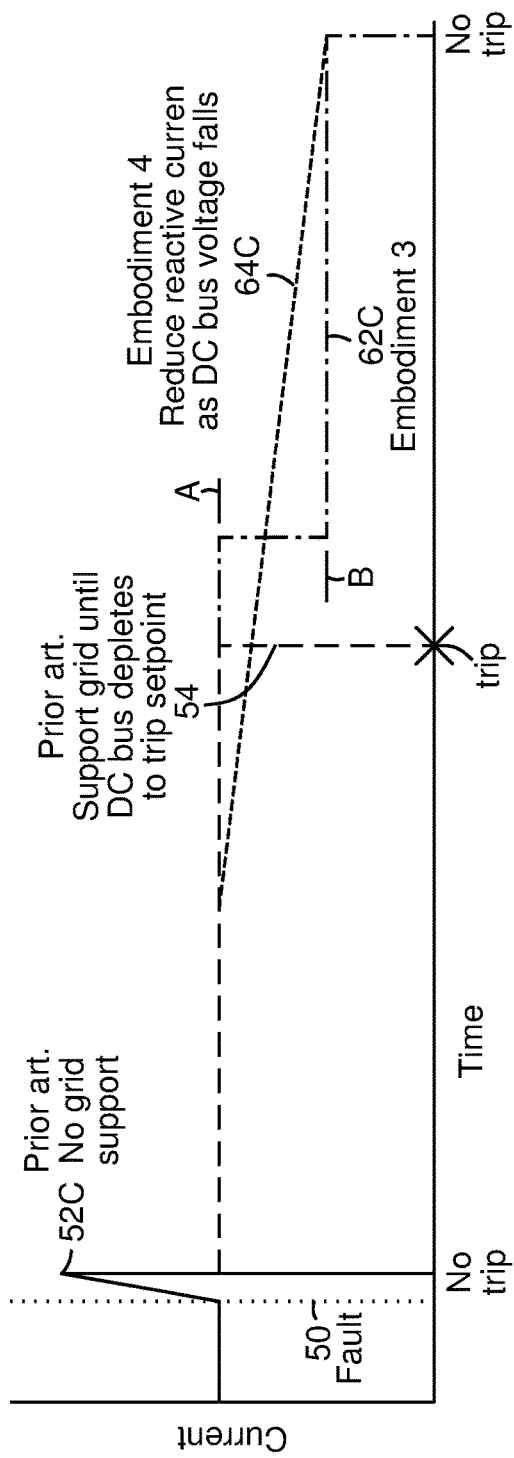
FIG. 4 shows aspects of two additional embodiments of the invention for reactive current response to low grid voltage when generator power is unavailable.
Figure 5:
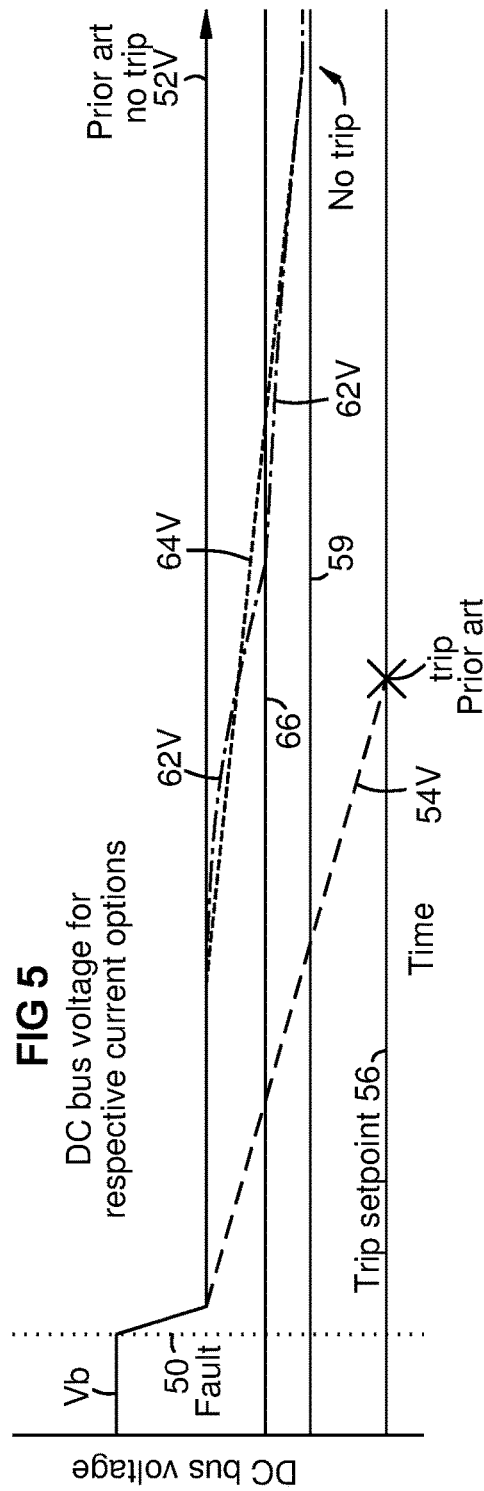
FIG. 5 shows the DC bus voltage over time for respective options of FIG. 4.

FIGS. 4 and 5 show aspects of third and fourth embodiments of the invention for controlling the reactive current output of the line-side converter during a low-voltage fault on the grid in STATCOM mode.

Embodiment 3 of the invention reduces the reactive current 62C from a first programmed value A to a second programmed value B that is less than the first programmed value when the DC bus voltage 62V drops to a first predetermined threshold 66. The reactive current output 62C is then dropped to zero when the DC bus voltage drops to a second predetermined threshold value 59 that is less than the first predetermined threshold value 66 and greater than the low DC bus voltage trip setpoint 56. This provides relatively higher support to the grid for a first part of fault duration, and lower support for a second part of the fault duration, while maintaining the DC bus above the trip setpoint 56. It provides a longer ride-through for a given battery size than option 60 of FIGS. 2 and 3.

Embodiment 4 reduces the reactive current 64C provided to the grid smoothly from a first programmed value A to a second programmed value B that is less than the first programmed value as the DC bus voltage 64V drops to a predetermined threshold value 59 that is above the DC bus low voltage trip setpoint 56. Reactive current is dropped to zero when the DC bus voltage reaches the predetermined threshold value 59. Embodiment 4 supports the grid in a graduated manner for ride-through of the fault, while maintaining the DC bus above the trip setpoint. It provides a longer ride-through for a given battery size than option 60 of FIGS. 2 and 3.

Referring to FIG. 1, in a fifth embodiment the processor 46 may execute program steps and control the line-side converter 38 so that when the turbine terminal voltage Vt falls below a predetermined minimum Vm (not shown), the line side converter 38 provides reactive current to the grid in an inverse relationship with grid voltage. An exemplary program form is:

$$\text{If } V_t < V_m \text{ then } I_r = K(1-(V_t/V_n))pu$$

where Ir is a per unit control value sent by the processor to the line side converter 38 to produce a corresponding reactive current level, Vn is a nominal turbine terminal voltage, and K is a constant. In another example, the program may increase the reactive current output by a given percentage for every incremental (such as 1%) drop in turbine terminal voltage below Vm until the turbine bus voltage Vb drops to the predetermined no-trip threshold 59, then the reactive current output is set to zero. An exemplary program form is:

$$\text{If } V_t < V_m \text{ then } I_r = (K^*(V_m-V_t))/V_n$$

For example, if Vn=690V, Vm=621V, Vt=586.5V (85% of nominal), and K=2, then Ir=0.10 pu, or 10%. The inverter produces reactive current 2% above a nominal amount thereof for every 1% drop in the turbine terminal voltage Vt below the minimum turbine terminal voltage of 621V, relative to the nominal terminal voltage Vn. In this specific example 10% reactive current is provided. The reactive current adjustment may be provided an upper limit, such as 1.1 times the nominal value. This embodiment provides progressive support for the grid voltage where the energy storage device 48 is sufficient for such support for the specified ride-through duration of the fault. It is noted that the control described here is based upon turbine terminal voltage, but it could be applied on the basis of grid or collector system voltage with communications between the grid and the turbine(s).

Figure 6:
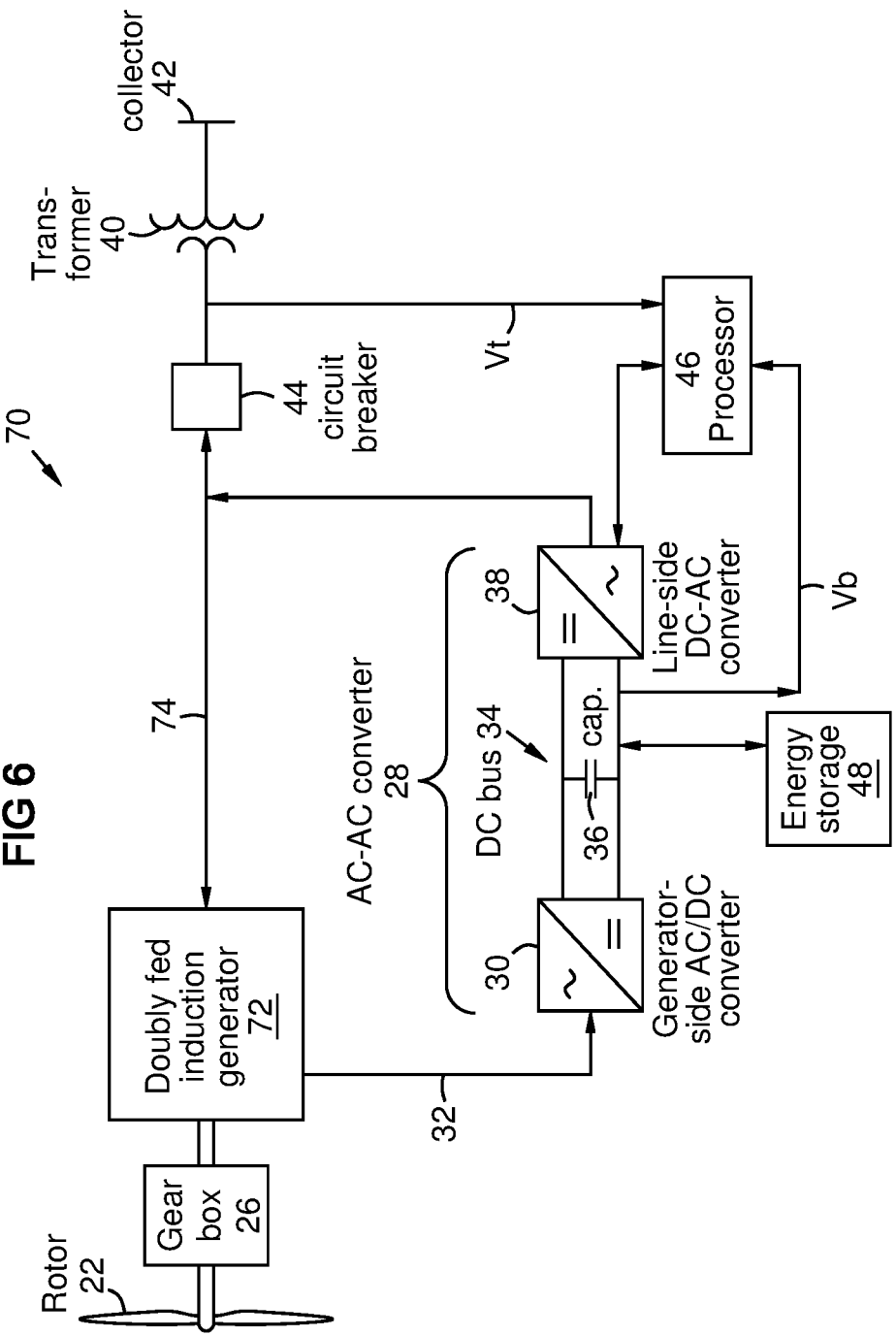
FIG. 6 is a schematic system view of a wind turbine energy resource comprising a doubly fed inductive generator, illustrating an aspect of an embodiment of the invention.

FIG. 6 illustrates a wind turbine energy resource 70 including an aerodynamic rotor 22 that drives a doubly fed induction generator 72 by direct drive or via a gear box 26. An AC-AC converter 28 has a generator-side AC-DC converter 30 that receives power 32 from the generator and converts it to DC power on a DC bus 34, which may include a capacitor 36. A line-side DC-AC converter 38 converts the DC voltage to AC at the grid frequency. Part of the inverter output 74 energizes the wound rotor of the doubly fed generator. The remainder is stepped-up by a transformer 40 for transmission to the grid. A collector 42 may collect power from one or more wind turbines. The line-side DC-AC converter is connected to the grid via a circuit breaker 44 that disconnects the wind turbine system from the grid in certain fault conditions. A processor 46 controls the AC-AC converter. In one embodiment of the invention, an energy storage device 48 such as a battery is connected to the DC bus to preserve voltage on the DC bus for a predetermined ride-through duration during a low voltage condition on the grid when generator power is unavailable. Aspects of the invention as previously described operate the same on this type of system.

Each of the present embodiments can act in a synchronous condenser mode when no load on the grid being supplied by the wind turbine energy resource during the fault on the grid. In this mode, the energy storage device provides short circuit current to cover real losses due to resistance in the circuits in order to support the DC bus voltage in the absence of wind power.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. In a power generation system comprising a wind turbine energy resource connected to a grid, a method comprising:
   setting a low DC bus voltage trip setpoint of the wind turbine energy resource;
   supporting a voltage on the grid by providing reactive current to the grid from an inverter of the wind turbine energy resource during a period when the wind turbine energy resource is not providing active power to the grid;
   monitoring a DC bus voltage of the wind turbine energy resource while supporting the voltage on the grid; and
   reducing an amount of the reactive current being supplied to the grid when the monitored DC bus voltage drops to a predetermined threshold value which is set above the low DC bus voltage trip setpoint of the wind turbine energy resource, thereby preventing the monitored DC bus voltage from dropping further to the low DC bus voltage trip setpoint and avoiding tripping of the wind turbine energy resource.

2. The method of claim 1, further comprising reducing the amount of the reactive current being supplied to the grid to zero when the DC bus voltage drops to the predetermined threshold value above the low DC bus voltage trip setpoint.

3. The method of claim 2, further comprising monitoring a turbine terminal voltage, and controlling the inverter to provide the reactive current to the grid when the turbine terminal voltage falls below a predetermined minimum voltage level.

4. The method of claim 1, further comprising:
   reducing the amount of the reactive current being supplied to the grid from a first programmed value to a second programmed value less than the first programmed value when the DC bus voltage drops to a first predetermined threshold value; and
   reducing the amount of the reactive current being supplied to the grid to zero when the DC bus voltage drops to a second predetermined threshold value less than the first predetermined threshold value with the second predetermined threshold value being set above the low DC bus voltage trip setpoint.

5. The method of claim 1, further comprising providing power to the DC bus to support the DC bus voltage while supporting the voltage on the grid.

6. The method of claim 5, wherein the power to the DC bus is provided from an energy storage device.

7. The method of claim 6, wherein the energy storage device is dimensioned to have sufficient capacity to maintain the DC bus voltage above the predetermined threshold value for at least a predetermined time period during a predetermined fault condition.

8. The method of claim 7, wherein the predetermined time period is at least 150 ms.

9. The method of claim 2, further comprising
   receiving communication responsive to grid or collector system voltage;
   monitoring the grid or collector system voltage, and when it falls below a predetermined level, controlling the inverter to provide the reactive current to the grid responsive to the monitored grid or collector system voltage; and
   reducing the reactive current to zero when the DC bus voltage drops to the predetermined threshold value.

10. A wind turbine energy resource comprising:
    a generator-side AC-DC converter that receives AC power from a generator and converts the AC power to a DC bus voltage,
    a line-side DC-AC inverter that converts the DC bus voltage to a grid AC voltage of a grid at a grid frequency,
    a DC bus connecting the DC bus voltage of the AC-AD converter and the DC-AC Inverter, and
    a processor comprising an input receiving the DC bus voltage of the DC bus, the processor having control logic to control the line-side DC-AC inverter to provide reactive power to an electrical grid connected to the wind turbine energy resource in a synchronous condenser mode without producing active power by reducing
    an amount of the reactive power supplied to the grid by the line-side DC-AC inverter when the DC bus voltage drops below a predetermined threshold value which is set above a DC bus low voltage trip setpoint of the wind turbine energy resource, thereby preventing the DC bus voltage from dropping further to the low DC bus voltage trip setpoint and avoiding tripping of the wind turbine energy resource.

11. The wind turbine energy resource of claim 10, further comprising a battery connected to the DC bus, with the battery configured to provide current sufficient to maintain the DC bus voltage above the predetermined threshold value for at least 150 ms during a predetermined fault condition of the grid.

12. A computer program stored on a non-transitory storage medium and comprising program steps which, when the computer program is loaded into a memory of the processor and the program steps are executed by the processor, protects a power transmission system during a fault condition by causing the-processor to:
    receive electronic communications that concurrently contain:
    a) an indication of a low voltage condition on a grid powered by an inverter of a wind turbine generator system; and
    b) an indication that the wind turbine generator system is in a synchronous condenser mode without producing active power;
    provide a voltage regulation of the grid during the low voltage condition by controlling the inverter to provide reactive current to the grid or absorb reactive current therefrom in response to electrical conditions of the grid;

sense a voltage on a DC bus connected to the inverter; and when the voltage on the DC bus falls below a predetermined threshold value, cease the voltage regulation of the grid to preserve a remaining voltage on the DC bus which is set above a DC bus low voltage trip setpoint of the wind turbine generator system, thereby preventing the sensed DC bus voltage from dropping further to the low DC bus voltage trip setpoint and avoiding tripping of the wind turbine generator system.

13. The computer program of claim 12, further comprising:

providing energy to the DC bus from an energy storage device connected to the DC bus while providing voltage regulation.

14. The computer program of claim 13, wherein the energy storage device is a battery with a capacity that maintains the voltage of the DC bus above the predetermined threshold value while providing the voltage regulation of the grid by the inverter for at least 150 ms during the low voltage condition.

* * * * *